United States Patent [19]
Koelman

[11] Patent Number: 5,608,323
[45] Date of Patent: Mar. 4, 1997

[54] ARRANGEMENT OF THE ELECTRODES FOR AN ELECTRICAL LOGGING SYSTEM FOR DETERMINING THE ELECTRICAL RESISTIVITY OF A SUBSURFACE FORMATION

[75] Inventor: Johannes M. V. A. Koelman, Rijswijk, Netherlands

[73] Assignee: Shell Oil Company, Houston, Tex.

[21] Appl. No.: 260,157

[22] Filed: Jun. 7, 1994

[30] Foreign Application Priority Data

Jun. 10, 1993 [EP] European Pat. Off. ............ 93201674

[51] Int. Cl.$^6$ .................................................... G01V 3/20
[52] U.S. Cl. ........................................... 324/368; 324/347
[58] Field of Search ......................... 324/347, 366–368, 324/370

[56] References Cited

U.S. PATENT DOCUMENTS

| | | | |
|---|---|---|---|
| 2,393,009 | 1/1946 | Chun | 324/366 |
| 2,729,784 | 1/1956 | Fearon | 324/368 |
| 4,359,687 | 11/1982 | Vinegar et al. | 324/366 |
| 4,464,930 | 8/1984 | Givens | 324/366 X |
| 4,686,477 | 8/1987 | Givens et al. | 324/366 |
| 4,931,736 | 6/1990 | Barlai et al. | 324/366 |
| 4,964,085 | 10/1990 | Coope et al. | 324/338 |
| 5,043,668 | 8/1991 | Vail, III | 324/368 |

FOREIGN PATENT DOCUMENTS

| | | | |
|---|---|---|---|
| 618463 | 10/1994 | European Pat. Off. | 324/368 |
| 1-29753 | 1/1989 | Japan | 324/368 |
| 1345151 | 10/1987 | U.S.S.R. | 324/368 |
| 88/03657 | 5/1988 | WIPO | |

Primary Examiner—Sandra L. O'Shea
Assistant Examiner—Jay M. Patidar

[57] ABSTRACT

The invention is an electrical logging system for determining the electrical resistivity of a subsurface formation from a cased borehole that may include voltage and current supply means, voltage and current control means, electrode support means, and voltage and current processing means. In particular, the system also may include a first pair of electrodes, current electrodes, and a second pair of electrodes, voltage electrodes. The current electrodes are adapted to be electrically connected at different heights to the casing within the borehole and nearby one of the ends of the borehole for supplying an electrical current to the casing. The space between the current electrodes defines an intermediate casing part through which casing current flows. The casing current flowing through the intermediate casing part causes the casing part below the intermediate casing part to have a different electrical potential than the casing part above the intermediate casing part. This results in a leakage current which flows between the casing part below the first electrodes and the casing parts above the first electrodes by way of the subsurface formation. The pair of voltage electrodes are adapted to be located on the casing part either above or below the current electrode for detecting voltages caused by the leakage current returning to that casing part from the subsurface formation. In this manner, the values obtained by the voltage electrodes are not affected by casing current since only leakage current flows into the portion of casing measured by the voltage electrodes.

19 Claims, 4 Drawing Sheets

ARRANGEMENT OF THE ELECTRODES FOR AN ELECTRICAL LOGGING SYSTEM FOR DETERMINING THE ELECTRICAL RESISTIVITY OF A SUBSURFACE FORMATION

BACKGROUND OF THE INVENTION

1. Field of the Invention

This invention relates to an electrical logging system. In particular, this invention relates to an electrical logging system for determining the electrical resistivity of a subsurface formation through a cased borehole.

2. Description of Related Art

Conventionally such a system comprises voltage and current supply means, voltage and current control means, electrode support means, and voltage and current processing means for processing currents and voltages thereby determining said electrical resistivity.

It is well known to apply the above system to carry out measurements in a logging procedure in order to determine electrical resistivity of the formation through the casing of a borehole. Generally metal casings are applied, in particular those made of steel. Borehole depths may be up to several thousands of meters. For example such a formation may have a structure of oil bearing layers having a resistivity quite different from the surrounding layers. More in particular the case of subsequent water- and oil-bearing layers occurs. Depending on the hydrocarbon saturation such layers typically have resistivities in the range of 1 to 1000 $\Omega$m.

Especially in situations of already existing boreholes having been cased, for example to update subsurface formation characteristics or to monitor production operating progress, it is of great interest to have reliable data.

As shown in U.S. Pat. No. 2,729,784, in the past attempts have been made to measure currents leaking from cased drill holes into the subsurface formation. Two axially spaced current electrode pairs housed in one and the same logging device were connected to the casing resulting in casing currents between the electrodes of each pair when energized. The electrical circuitry was chosen such that the two neighbor electrodes of said two pairs had the same electrical potential thus defining a casing part therebetween functioning as a quasi separate electrode from which currents leaked into the formation. By providing three additional electrodes in the casing part between said two pairs of electrodes both a symmetrical electrical potential distribution is set and voltage measuring is accomplished allowing the determination of the electrical resistivity of the subsurface formation.

However, it is well known that electrical measurements on casings are far from ideal because of roughnesses of the casing, for example caused by differences in casing thickness and corrosion spots. Thus casing resistances are affected substantially. In the above logging method such disadvantageous effects are combined with electrical measuring and control on small leakage currents starting from the above-mentioned short casing part between the electrode pairs. In view of the above, this means that only very small voltages can be measured whereas the reliability of such measurements has to be considered very low. Consequently large deviations in the subsurface formation resistivity should be expected.

From recent literature it is known to handle the above-mentioned situations and cases in a different way. For example U.S. Pat. No. 5,043,668 discloses a method and apparatus for determining the above said resistivity through the casing of a borehole. In particular, three current electrodes and three voltage electrodes are employed, five electrodes being electrically connected to the casing at different heights, measured in axial direction of the borehole, and one current electrode being arranged at a substantial distance therefrom within the earth's surface.

By means of this set-up both calibration measurements and resistivity determinations are carried out.

In the calibration measurement mode, a casing current between the two current electrodes connected to the casing induces two voltage indications between the three voltage electrodes which are connected to the casing and are arranged between said two current electrodes. Said indications reflect the casing resistances between said voltage electrodes. Again casing resistances are affected as explained above. Therefore said two voltages are supplied to electronic circuitry in order to control and to balance the respective proportional voltage indications.

In the resistivity determination mode the same voltage electrodes are used. However, now an electrical current is induced into the casing and into the formation from the upper current electrode which forms an electrical circuit with the current electrode arranged within the earth's surface. Clearly in this mode leakage currents, leaking into the formation, occur. Consequently in this mode, the voltage indications as detected by the above mentioned three voltage electrodes are more or less modified. Typically in this mode mainly casing currents, which are many orders larger than the leakage currents because of the corresponding difference between casing resistivity and formation resistivity, are inducing said proportional voltages. Notwithstanding the above, the differences between the voltages obtained from the above explained two modes of operation, although being very small, reflect said leakage currents. As a result thereof formation resistivity can be determined.

Also for this set up, it will be clear to those skilled in the art that only slight variations as to said differences, for example caused by corrosion spots, electrical perturbation, mechanical damage, or circuitry tuning, will result in substantial casing current errors. Consequently obtaining reliable leakage current determinations is very difficult.

SUMMARY OF THE INVENTION

Thus it is a main object of the present invention to detect leakage currents more accurately.

It is a further object of the present invention to eliminate the contribution of the casing currents in the leakage current detection as much as possible.

Therefore in accordance with the invention the above system further comprises:

a first pair of current electrodes, A, B, connected with said supply means and said control means, adapted to be electrically connected to the casing within said borehole at different heights in axial direction of said borehole, and, when connected, defining an intermediate casing part, for supplying an electrical current to said casing and providing a casing current through said casing part between said electrodes, and positioned nearby one of the ends of the borehole, and a second pair of voltage electrodes, M, N, for detecting voltages provided by leakage currents leaking from the casing into the formation, said second pair of electrodes being adapted to be arranged in axial direction of the borehole above or below said first pair of current electrodes between said intermediate casing part and the other end of the borehole.

In a further embodiment of the present invention at least one electrode of the second pair of electrodes is adapted to be electrically connected to the casing within said borehole. Furthermore, if both electrodes of said second pair are electrically connected to said casing, one electrode of said second pair of electrodes, M, is arranged in axial direction of the borehole adjacent to said first pair of electrodes and the other at a substantial distance away from said one electrode.

In particular said other electrode, M, is arranged down below in the borehole nearby the casing shoe, or said other electrode, N, is arranged at the top of the borehole nearby the earth's surface.

In yet a further embodiment of the present invention said second pair of electrodes is adapted to be located at the earth's surface.

In a preferred embodiment of the present invention at least a third voltage electrode, adapted to be electrically connected to the casing within said borehole as a calibration electrode, R, is arranged adjacent to said first pair and at the other side of said first pair of electrodes compared to said second pair of electrodes.

By using the electrical logging system of the present invention, every current travelling through the casing outside said intermediate casing part is only originating from leakage currents which start predominantly from the casing outside said intermediate casing part from the casing part at one side of said intermediate casing part, leak into the formation and return through the casing at the other side of said intermediate casing part. Thus the voltage electrodes of the second pair only detect leakage currents either in the formation or through the casing, dependant on the location of said second pair voltage electrodes. Advantageously casing currents are fully eliminated when detecting such leakage currents, thus allowing accurate determination of formation resistivities.

These and other objects and advantages of the present invention will no doubt become apparent to those of skill in the art after having read the following detailed description of the preferred embodiments which are contained herein and illustrated by various figures.

The invention encompasses the heretofore described embodiments as well as embodiments that are described hereinafter and as will be apparent to those of skill in the art.

BRIEF DESCRIPTION OF THE DRAWINGS

The present invention will be described in detail hereinafter, thereby referring to the figures, wherein FIG. 1a schematically shows a preferred arrangement of electrodes of the electrical logging system of the present invention, wherein FIG. 1b presents voltage curves provided by the logging system of FIG. 1a, wherein FIG. 1c schematically shows an alternative arrangement of electrodes of the electrical logging system of the present invention, wherein FIG. 2 schematically shows the relation between voltages measured and the casing lengths over which leakage currents are starting from, and entering into a homogeneous formation, wherein FIG. 3 schematically shows the relation as shown in FIG. 2, now for a layered formation, wherein FIGS. 4a, 4b and 4c represent configurations for arranging the electrodes in accordance with the invention, and wherein

DESCRIPTION OF THE EMBODIMENTS

Figures 1A, 1B:
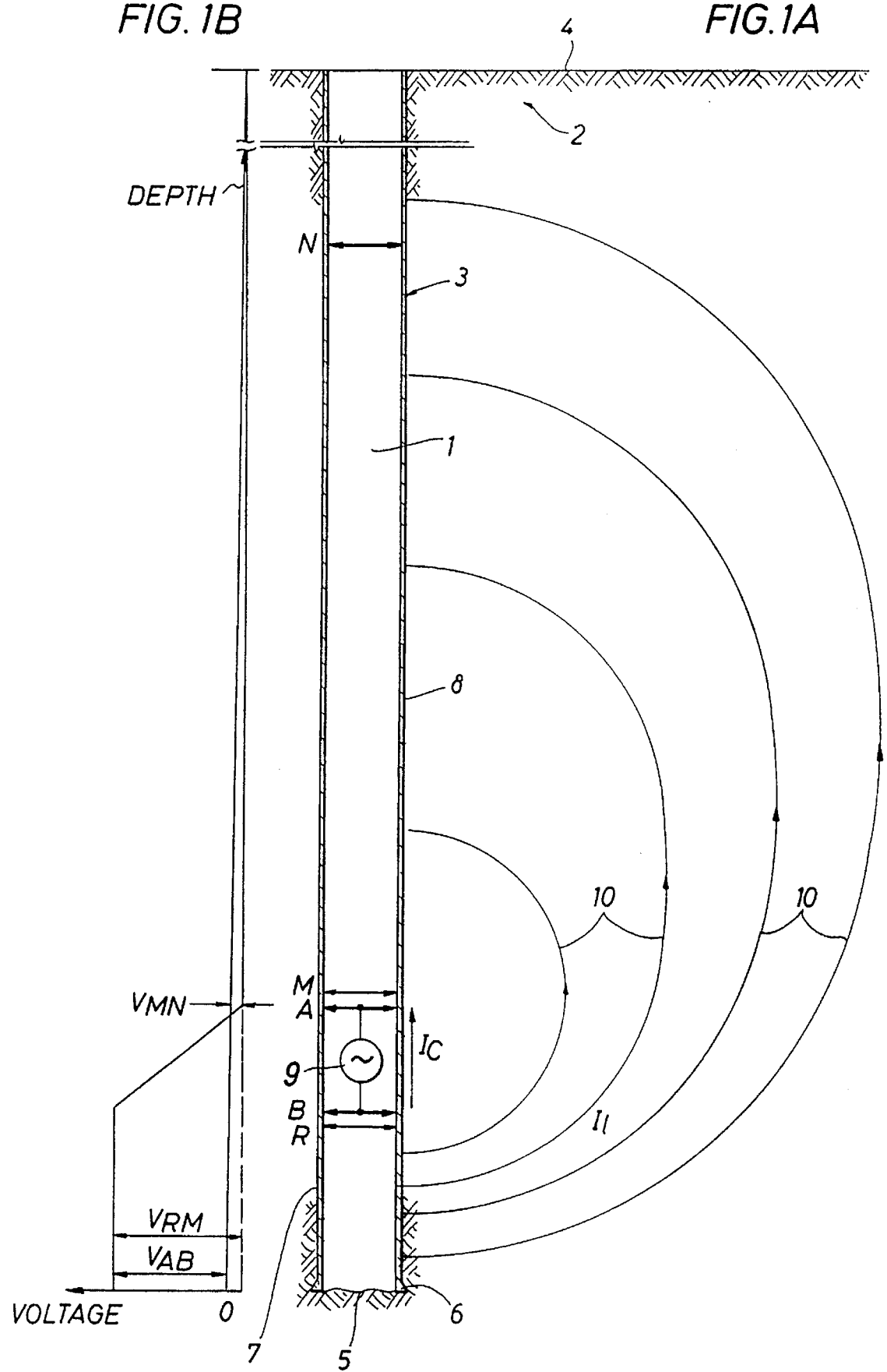

For explaining the principles of the present invention there is referred to FIGS. 1a and 1b.

FIG. 1a schematically shows a borehole 1 which is drilled into subsurface formation 2. The borehole has been cased with casing 3, by way of example extending from the earth's surface 4 to the bottom 5 of the borehole 1. The lower end of the casing has been fastened into the formation by means of a casing shoe 6. In order to mark positions within the borehole both depth values as measured from the earth's surface and height values as measured from the borehole bottom are used, both being measured in the axial direction of the borehole. Thus, if the borehole is drilled not strictly vertically, depth- and height-values have to be read as length-values along the axis of the borehole.

As usual the casing is made of a metal, for example steel. Any other material may be applied provided that the casing is electrically conducting which is required for the system and method of the present invention.

For determining electrical formation resistivity mostly a well log is accomplished from uncased boreholes whereas the borehole is only cased after exploration and logging procedures and before starting production operations. As explained hereinabove, also after having cased the borehole, it may be desirable or even necessary to determine the electrical resistivity, for example for monitoring the electrical characteristics of the formation from which hydrocarbons are recovered. This means that electrical measurements have to be carried out through the metal casing, the highly electrically conducting casing being embedded in a highly electrically resistive formation, thus giving electrical currents substantially only through said casing.

Figure 4A:
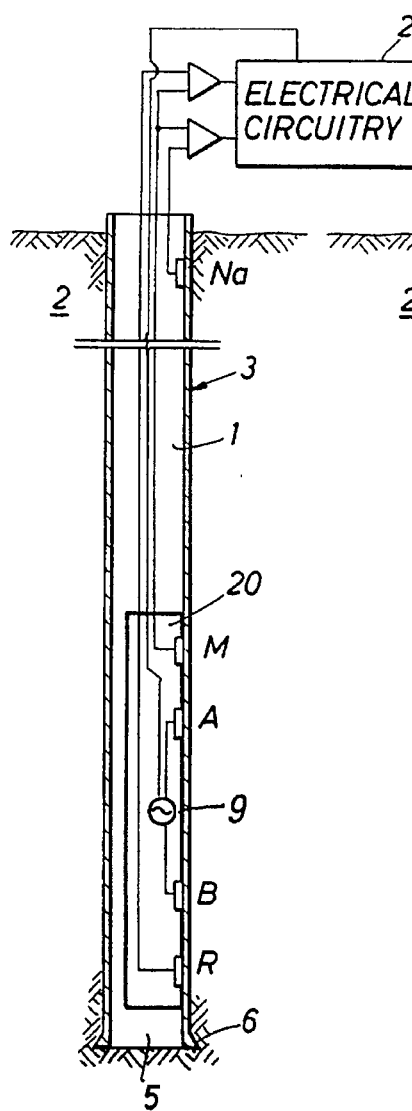
Figure 4B:
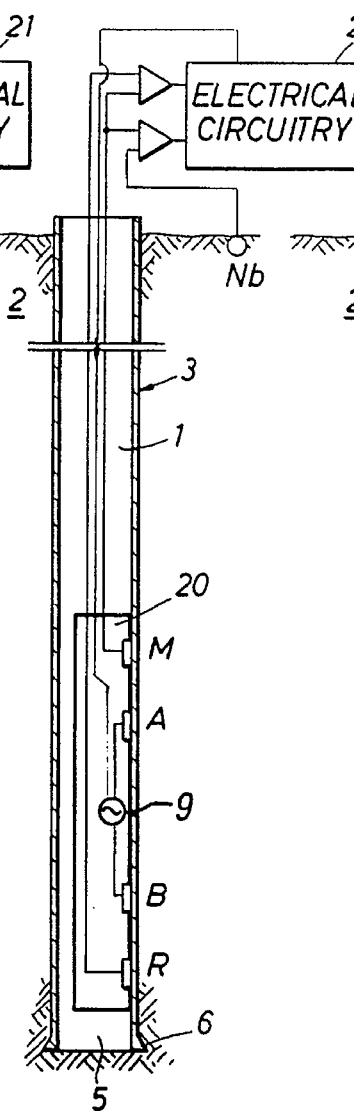
Figure 4C:
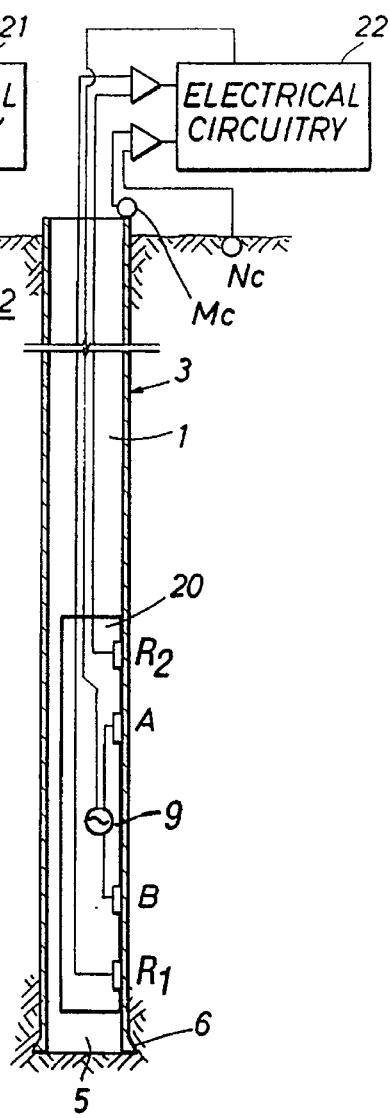

According to the present invention by employing a first pair of current electrodes (A, B), a casing current $I_c$ is flowing only between A and B. Typically low frequency currents are provided by means of a current source 9, which is connected to electronic circuitry 21 and 22 for controlling and supplying current and/or voltage between electrodes A and B as shown in FIGS. 4a, 4b and 4c. Advantageously frequencies up to 20 Hz and current amplitudes up to 40 A are employed.

In order to simplify further explanations, current electrode B is chosen as the electrode having the higher electrical potential. Consequently casing current $I_c$ is flowing from B to A, whereas leakage currents $I_l$ are starting predominantly from the B side casing part, are subsequently flowing through the subsurface formation and will return through the casing at the A side casing part. It may be clear that this situation is fully symmetrical with the case of reversed potentials of A and B. Furthermore it is noted that, although conventionally an AC set-up is arranged for the frequencies mentioned-above, DC data processing is allowed.

As can be seen in FIG. 1a, said first pair is arranged near the bottom 5, thereby obtaining at the side of B an end part 7 of the casing 3 which is relatively short. Typically the length of said end part 7 is chosen such that the electrical potential over said part is substantially equal to the potential of the adjacent current electrode. Conventionally at the side of A at the other side of said first pair of electrodes, the potential of the other casing part 8 is substantially equal to the electrical potential at infinity which is mostly defined as zero potential as shown in FIG. 1b. Thus, clearly a voltage is created between casing parts 7 and 8.

Consequently the very large part of leakage currents $I_l$ will flow between said two casing parts 7 and 8 thereby passing the subsurface formation 2. As set forth above said end part 7 has the higher electrical potential and therefore $I_l$ flows from part 7 to part 8 as indicated by the arrows in the current flow lines 10. Furthermore, by having a relatively short end part 7 both starting position for said $I_l$ is well defined and sensitivity in resistivity variations dependent on possible presence of layered formations on said end part location is obtained. This means that if the length of said end part 7 is varied, changes in resistivity are monitored. It will be clear to those skilled in the art that the same explanation can be given for the symmetrical arrangement with said first pair at the upper end of the borehole nearby the earth's surface.

Further to the above explanation, only giving conditions and details on starting of leakage current $I_l$, said currents have to be detected in order to arrive at data allowing determination of the formation resistivity. Therefore in accordance with the present invention, leakage currents are detected at the other side of the first pair A, B. As can be seen in FIG. 1a, a second pair of voltage electrodes (M, N) is arranged within and connected to the other casing part 8. Thus $I_l$ is detected when returning to and flowing through said casing part 8.

Generally the second pair of voltage electrodes has to be arranged such that the spacing between the voltage electrodes bridges a difference in electrical potential. In the present case of having a cased borehole and the first pair of current electrodes with the very large part of leakage currents starting in axial direction from beneath the second pair, then the voltage electrodes have to be arranged in the return flow of said currents. Especially on locations where said currents are most diverging, the arrangement of electrodes is most preferred. Thus large spacings between M and N, for example when arranged upon the casing, are preferred when the arrangement of FIG. 1a is used. Other arrangements for M and N may be utilized such as shown by FIGS. 4b and 4c which will be explained hereinafter.

Figure 1C:
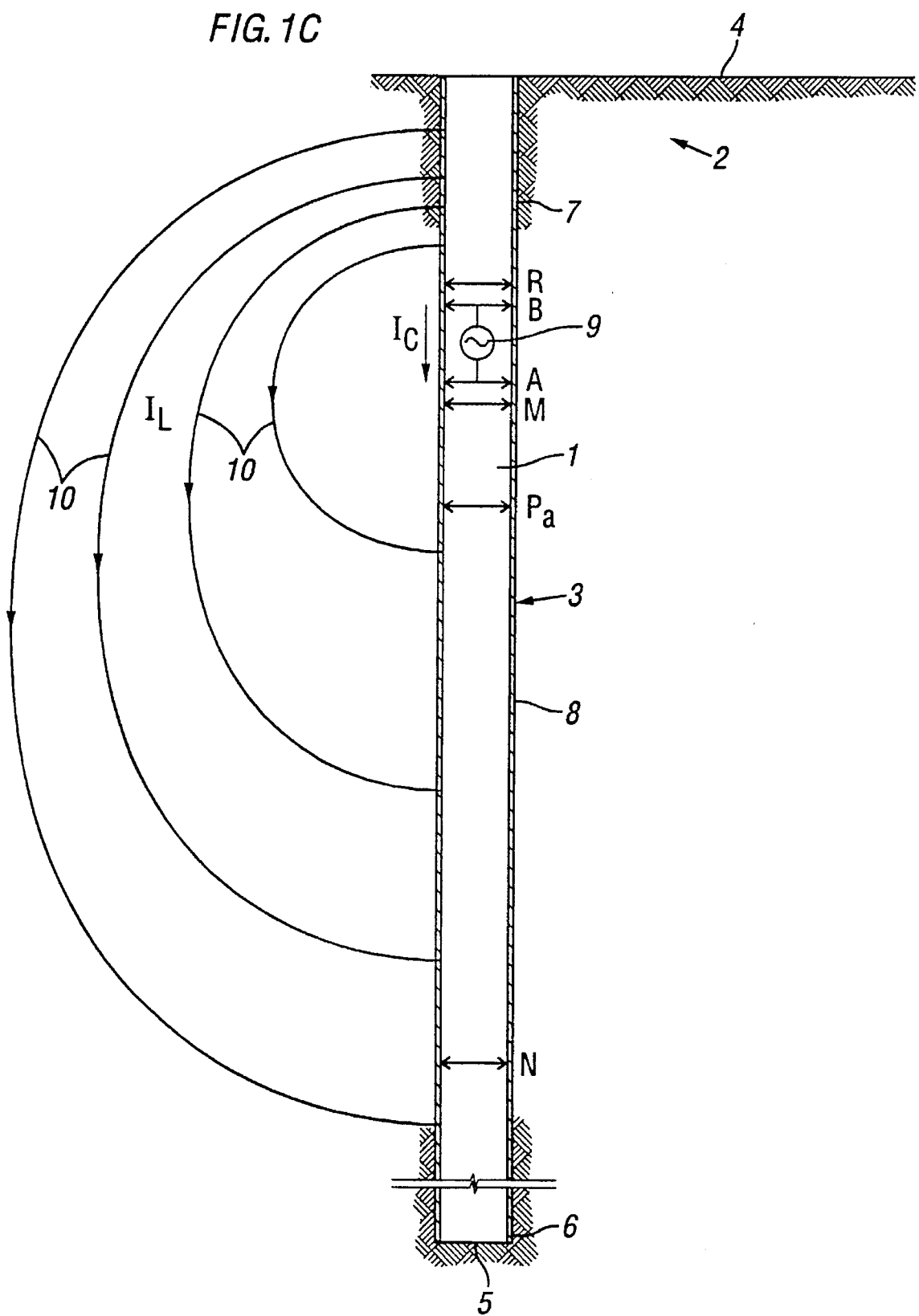

An alternative embodiment for the electrodes, with the pair of voltage electrodes (M and N) positioned below the pair of current electrodes (A and B), is shown in FIG. 1c. In this embodiment for an electrical logging system for determining the electrical resistivity of a subsurface formation through a cased borehole, the system includes a voltage and current supply means, a voltage and current control means, and an electrode support means. The embodiment further includes a pair of current electrodes that are connected to the supply means and control means, that are adapted to be electrically connected to the casing within the borehole at different heights in the axial direction of the borehole, and that define when connected an intermediate casing part for supplying an electrical current to the casing and for providing a casing current through the casing part between the electrodes. This current electrode pair may be positioned nearby the borehole's top, whereby the borehole casing has three parts, a casing part above the intermediate casing part, the intermediate casing part and a casing part below the intermediate casing part. The embodiment also includes a second pair of voltage electrodes for detecting voltages provided by leakage currents leaking from the casing into the formation. This second pair of electrodes is adapted to be arranged in an axial direction of the borehole and to be electrically connected to the casing part below the intermediate casing part. Finally, the embodiment includes a voltage and current processing means for processing the currents and voltages to determine the electrical resistivity of the subsurface formation.

In a further embodiment of the system shown in FIG. 1c, the ratio of the distance between the current electrodes, measured in the borehole direction, and the casing diameter, ranges from 3 to 15. Further, the casing current provided may be an AC current having a frequency up to 20 Hz and an amplitude up to 40 A.

In still a further embodiment, a first electrode of the second pair of voltage electrodes in the system embodiment shown in FIG. 1c may be functional to be arranged in the axial direction of the borehole below and adjacent to the first pair of electrodes, and the other voltage electrode of the second pair may be functional to be located at a substantial distance away from the first electrode of the second pair. In a further embodiment of the system shown in FIG. 1c, this other electrode of the second pair of voltage electrodes may be arranged near the borehole's casing shoe at the bottom of the borehole.

In still a further embodiment of the system shown in FIG. 1c, a third voltage electrode (R) may be included that is functional for being electrically connected to the borehole casing, that is arranged above and adjacent to the first pair of current electrodes, and that is electrically connected to the casing part above the intermediate casing part. This third voltage electrode may be used in conjunction with at least one voltage electrode of the second pair of voltage electrodes for calibration measurements. As a further variation of this embodiment, the voltage electrode of the second pair that is adjacent to the first pair of current electrodes and the third voltage electrode are arranged symmetrically with respect to the first pair of current electrodes for the calibration measurements.

The system shown in FIG. 1c may also be modified to include at least one additional voltage electrode ($P_a$). This additional voltage electrode may be functional to be used in conjunction with the second pair of electrodes to detect perturbation currents. This may be accomplished by locating the additional voltage electrode between the second pair of voltage electrodes and electrically connecting the additional voltage electrode to the casing part below the intermediate casing part.

In order to detect $I_l$ in an accurate way, a large spacing is chosen between M, N, thereby detecting the very large part of $I_l$. Moreover, over such large spacings the combination of low casing resistivity and low $I_l$-values results in voltages which are very well detectable.

From the above it will be clear that a number of advantages is obtained. First of all, casing currents and leakage currents are separated in a clear way. Consequently said leakage currents are detected fully separately. Moreover, large spacings between the voltage electrodes allow advantageous detection of said leakage currents.

In the following, determination of the formation resistivity is explained.

In accordance with Ohm's Law, resistivities can be determined only when having both current- and voltage-values. In the present invention, it is assumed that casing resistivity has a known value, for example by specification or by having been determined previously to the logging operation of the present invention. Thus, the voltages measured by means of the second pair of electrodes are converted to leakage current values. At the other side, casing currents are converted to voltage values being equal to the difference in electrical potential between the casing parts 7 and 8. Consequently formation resistivities are determined from combining the above said leakage current values and voltage values obtained by conversion.

As to the determination of casing resistivity, a further explanation is given hereinafter. In view of the above addressed variations in casing resistivities, a further embodiment of the present invention comprises connection of an additional voltage electrode, a calibration electrode R, employed for monitoring said varying casing resistivity and thereby consequently calibrating the measurements carried out during a logging procedure. As can be seen in FIG. 1a, said electrode R can be combined with one of the voltage electrodes M, N, where R and for example M are positioned at predetermined positions at different sides of the casing part located between the first pair A, B. For example R and M can be positioned symmetrically with respect to the A, B-pair in order to simplify calibration procedures.

As addressed hereinbefore, the length of end part 7 can be varied in order to trace layer structures in the following way.

In case of a homogeneous subsurface formation 2, the $I_l$-current flow pattern which will occur is shown in FIG. 1a. This means that the density of flow lines is most concentrated at said end part. Furthermore the pattern at said end part is clearly determined by the formation resistivity at that location. Thus by applying the method and system of the present invention formation resistivities are monitored at the starting position of the leakage currents $I_l$.

When varying the lengths over relatively short distances (for example, by starting with logging having the first pair of electrodes nearby the bottom of the borehole and subsequently lifting said pair), although the height becomes larger, the density of flow lines will be modified only very slightly. This means that over such a larger end part, $I_l$ is increasing substantially linearly and thus a greater leakage current $I_l$ is starting from said end part. Consequently for this homogeneous formation correspondingly greater voltages are measured by means of the second pair of electrodes M, N. The above explained relations for such a logging procedure are presented schematically in FIG. 2. In this Figure z schematically represents the height of end part 7 of the casing between a predefined position with respect to the first pair of electrodes and the bottom of the borehole. However, it will be clear to those skilled in the art that for relatively larger end parts resulting from lifting over correspondingly large distances modified relations have to be derived because of different behavior of starting of leakage currents.

Figure 3:
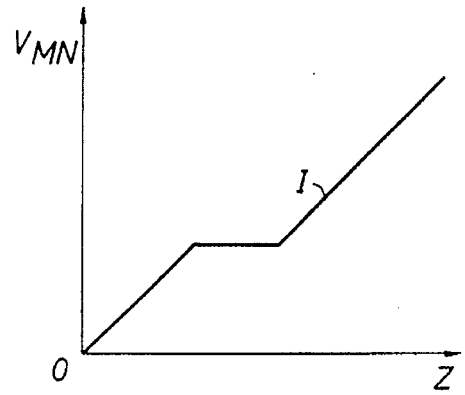

In the next FIG. 3, the case is represented when during logging, as sketched above, said first pair of electrodes is passing a layer having a resistivity larger than the resistivity when starting the logging procedure. When said layer is reached during lifting, the leakage current will only slightly increase if any. After the layer has been passed a further increase is presented in said figure.

From the above it may be clear that layered structures can be traced, whereas accurate modelling and processing of the data obtained during logging will allow determination of layer thicknesses and resistivity-values.

Referring now to FIGS. 4a, b, and c further embodiments of the present invention are shown. In FIG. 4a only relevant details are numbered and indicated which are the same as those used in FIG. 1a. As to FIGS. 4b and 4c especially the electrodes are indicated thereby emphasizing the differences between these figures.

In detail, in the electrode arrangement of FIG. 4a, the electrodes A, B, M and R, are housed in one and the same tool 20. By using such a tool, logging can be carried out in a simple and economic way which is very well known. The other voltage electrode of the second pair is now indicated with $N_a$. Further electrical circuitry, for example voltage and current control means and voltage current processing means, is numbered 21.

In the arrangement of FIG. 4b the other voltage electrode $N_b$ is now arranged at the earth's surface. This set-up will further simplify preparations and operation of the logging procedure. Although in this set-up, the very large part of $I_l$ will be picked-up between M and $N_b$, some additional modelling may be necessary.

In FIG. 4c the electrode arrangement has been further modified. Now both voltage electrodes $M_c$, $N_c$, are arranged at the earth's surface, $M_c$ being connected to the casing. In order to accomplish calibration measurements as explained before, tool 20 now houses two calibration electrodes $R_1$, $R_2$, functioning as voltage electrodes in the same way as shown in FIGS. 1, 4a and 4b, with respect to the voltage electrodes M and R. In correspondence with the modified electrode arrangement, electrical circuitry 22 is adapted. The present $M_c$, $N_c$ electrode-arrangement necessitates further modelling as to processing of the data obtained when logging by means of the logging system of this FIG. 4c.

Figure 5A:
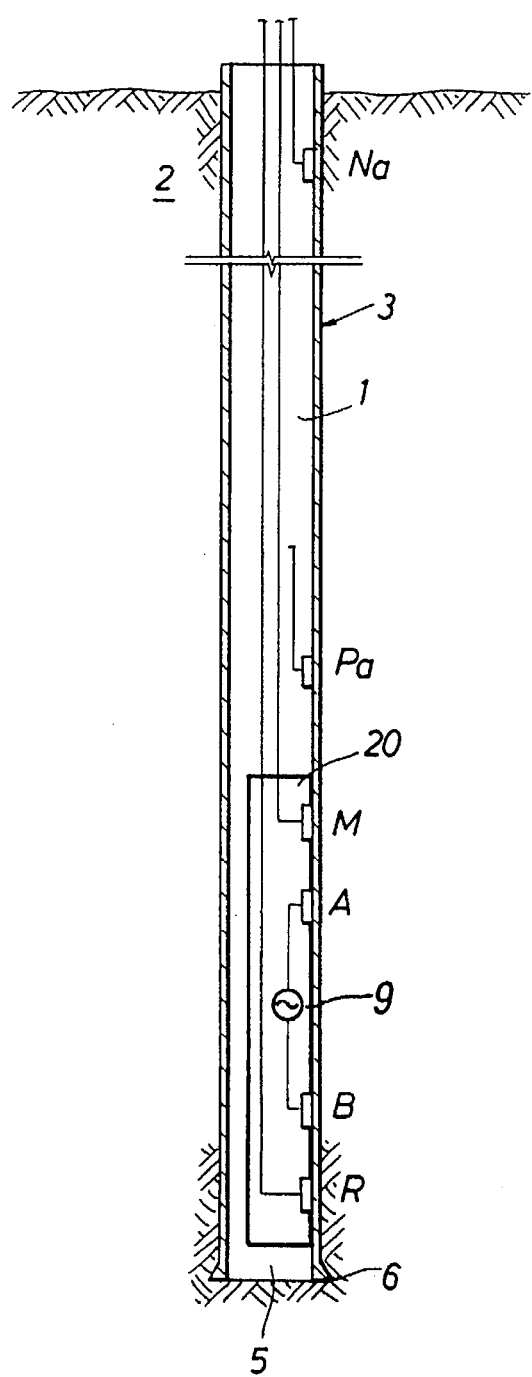
FIGS. 5a and 5b represent configurations similar to FIGS. 4a, 4b and 4c having an additional voltage electrode for measuring pertubation currents in accordance with the invention.
Figure 5B:
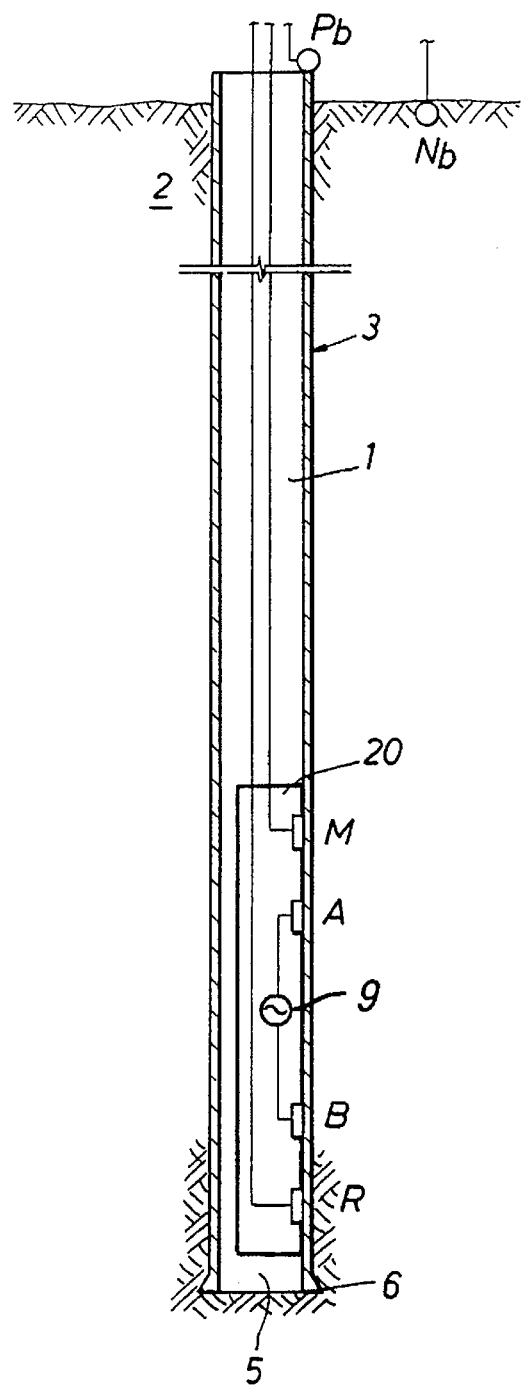

In a further preferred embodiments of the present invention, as shown in FIGS. 5a and 5b, at least one additional voltage electrode, $P_a$ in FIG. 5a and $P_b$ in FIG. 5b, is arranged at a location substantially between those of the second pair for picking up perturbation currents.

As well know to those skilled in the art, currents caused by natural conditions or human employments are passing continuously the subsurface formation. For example, thunderstorms and related electrical discharges and train traffic phenomena have appeared to give stray currents to an appreciable amount. These currents, although small, often form large perturbations with regard to leakage currents origination from the above first pair of electrodes of the present invention. In particular in the cases of FIGS. 5a and 5b, the arrangement of at least one additional voltage electrode, $P_a$ and $P_b$ respectively, adapted to be electrically connected to the casing allows an accurate determination of the above perturbation currents passing the casing lengths located between the voltage electrodes. Consequently, when leakage currents are measured, leakage current measurements can be corrected for said perturbation currents.

Further to the explanations in the foregoing, some details on specifications with regard to geometry, spacings and distances as applied in the system of the present invention are set forth.

In order to have a balance between current amplitude of casing current and of leakage currents, the ratio of spacing between current electrodes A and B ($d_{AB}$), and of casing diameter ($d_c$) is chosen advantageously between 3 and 15. However, in case of very thin layers ratio-values well below 3 should be applied, whereas in the case of measuring resistivity at large distances from the cased borehole ratio values well above 15 may be advantageous.

Figure 2:
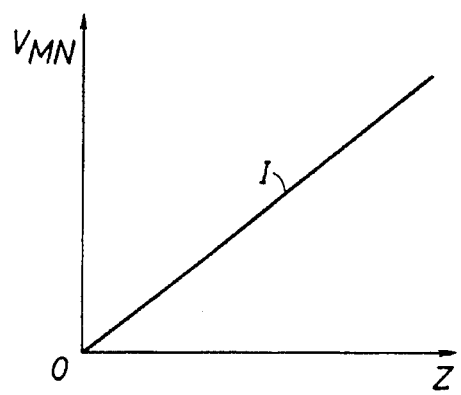

Referring to FIGS. 2 and 3, preferably, heights z of end part 7 should not exceed 300 m. In case of larger heights, density of current flow lines is lowered such that only a small increase of leakage currents $I_l$ will occur. As to spacings between voltage electrodes M and N, relatively large distances are preferred. Distances greater than 100 m have appeared to be advantageous. However, it may be clear to those skilled in the art that said distances are strongly dependant on the combination of casing conductivity, formation resistivity, and leakage current amplitude. Thus distances outside the above-mentioned ranges may be utilized.

Various modifications of the present invention will become apparent to those skilled in the art from the foregoing description. Such modifications are intended to fall within the scope of the appended claims.

What is claimed:

1. An electrical logging system for determining the electrical resistivity of a subsurface formation through a cased borehole, the system comprising:

a voltage and current supply means for supplying voltage and current to provide a casing current;

a voltage and current control means coupled to said voltage and current supply means for controlling said voltage and current supply means;

an electrode support means for supporting a plurality of electrodes;

a pair of current electrodes coupled to said electrode support means, connected with said supply means and said control means, and adapted to be electrically connected to a casing within said cased borehole at different heights in an axial direction of said borehole, said pair of current electrodes, when connected, defining an intermediate casing part, for supplying an electrical current to said casing and providing said casing current through said casing part between said electrodes, and being positioned nearby a bottom of said cased borehole, whereby the borehole casing has three parts, a casing part above the intermediate casing part, the intermediate casing part and a casing part below the intermediate casing part;

a pair of voltage electrodes, for detecting voltages provided by leakage currents leaking from the casing into the formation, said pair of electrodes being positionable above said pair of current electrodes; and voltage and current processing means connected with said pair of voltage electrodes for processing said leakage currents and voltages thereby determining said electrical resistivity of said subsurface formation through said cased borehole.

2. The system as claimed in claim 1, wherein at least one electrode of the pair of voltage electrodes is adapted to be electrically connected to the casing part above the pair of current electrodes.

3. The system as claimed in claim 2, wherein, both electrodes of said pair of voltage electrodes are adapted to be electrically connected to the borehole casing such that a first electrode of said pair of voltage electrodes is arranged in an axial direction of the borehole and electrically connected to the casing part above the intermediate casing part and adjacent to said pair of current electrodes and a second electrode of said pair of voltage electrodes is electrically connected to the casing part above the intermediate casing part and located at a substantial distance away from said first electrode of said pair of voltage electrodes.

4. The system as claimed in claim 3, wherein said second electrode of said pair of voltage electrodes is arranged at the borehole's top.

5. The system as claimed in claim 2, also including:

at least a third electrode which is adapted to be electrically connected to the borehole casing such that the third voltage electrode is arranged below and adjacent to said pair of current electrodes and electically connected to the casing part below the intermediate casing part wherein the third voltage electrode is used in conjuction with at least one voltage electrode of the pair of voltage electrodes for calibration measurements.

6. The system as claimed in claim 5, wherein the voltage electrode of the pair of voltage electrodes that is adjacent to the pair of current electrodes and the third voltage electrode are arranged symmetrically with respect to the pair of current electrodes for calibration measurements.

7. The system as claimed in claim 1, wherein said pair of voltage electrodes is adapted to be located at the earth's surface such that both voltage electrodes are spaces apart with one of the voltage electrodes being connected to the borehole casing adjacent the borehole's top and the other voltage electrode of the pair of voltage electrodes being arranged at the earth's surface.

8. The system as claimed in claim 1, wherein the ratio of the distance between the pair of current electrodes, measured in the borehole direction, and the casing diameter, ranges from 3 to 15.

9. The system as claimed in claim 1, also including:

at least one additional voltage electrode, the additional voltage electrode being adapted to be used in conjunction with the pair of voltage electrodes to detect perturbation currents by locating the additional voltage electrode between said pair of voltage electrodes.

10. The system as claimed in claim 9 wherein said at least one additional voltage electrode is electrically connected to the borehole casing.

11. The system as claimed in claim 1 wherein the casing current provided by said voltage and current supply means through said pair of current electrodes is an AC current having a frequency up to 20 Hz and an amplitude up to 40 A.

12. An electrical logging system for determining the electrical resistivity of a subsurface formation through a cased borehole, the system comprising:

a voltage and current supply means for supplying voltage and current to provide a casing current;

a voltage and current control means coupled to said voltage and current supply means for controlling said voltage and current supply means;

an electrode support means for supporting a plurality of electrodes;

a pair of current electrodes coupled to said electrode support means, connected with said supply means and said control means, and adapted to be electrically connected to a casing within said cased borehole at different heights in an axial direction of said borehole, said pair of current electrodes, when connected, defining an intermediate casing part, for supplying an electrical current to said casing and providing said casing current through said casing part between said electrodes, and being positioned nearby the borehole's top, whereby the borehole casings has three parts, a casing part above the intermediate casing part, the intermediate casing part and a casing part below the intermediate casing part;

a pair of voltage electrodes, for detecting voltages provided by leakage currents leaking from the casing into the formation, said pair of voltage electrodes being positionable in an axial direction of the borehole and electrically connected to the casing part below the intermediate casing part, and voltage and current processing means connected with said pair of voltage electrodes for processing said leakage currents and voltages thereby determining said electrical resistivity of said subsurface formation through said cased borehole.

13. The system as claimed in claim 12, wherein, a first electrode of said pair of voltage electrodes is adaped to be arranged in the axial direction of the borehole below an adjacent to said pair of current electrodes and a secondvoltage electrode of said pair of voltage electrodes is adapted to be located at a substantial distance away from said first electrode of said pair of voltage electrodes.

14. The system as claimed in claim 13, wherein said second electrode of said pair of voltage electrodes is arranged near a bottom of said cased borehole.

15. The system as claimed in 12, also including: at least a third voltage electrode which is [functional for being] adapted to be electrically connected to the borehole casing such that the third voltage electrode is arranged above and adjacent to said pair of current electrodes and electrically connected to the casing part above the intermediate casing part wherein the third voltage electrode is used in conjunction with at least one voltage electrode of the pair of voltage electrodes for calibration measurements.

16. The system as claimed in claim 15, wherein the first voltage electrode of the pair of voltage electrodes that is adjacent to the pair of current electrodes and the third voltage electrode are arranged symmetrically with respect to the pair of current electrodes for calibration measurements.

17. The system as claimed in claim 12, wherein the ratio of the distance between the pair of current electrodes, measured in the borehole direction, and the casing diameter, ranges from 3 to 15.

18. The system as claimed in claim 12, also including: at least one additional voltage electrode, the additional voltage electrode being [functional]dapted to be used in conjunction with the pair of voltage electrodes to detect perturbation currents by locating the additional voltage electrode between said pair of voltage electrodes and electrically connecting the additional voltage electrode to the casing part below the intermediate casing part.

19. The system as claimed in claim 12 wherein the casing current provided by said voltage and current supply means through said pair of current electrodes is an AC current having a frequency up to 20 Hz and an amplitude up to 40 A.

* * * * *